(12) United States Patent
Smith et al.

(10) Patent No.: US 10,477,014 B1
(45) Date of Patent: Nov. 12, 2019

(54) RAPID DATA ACCESS

(71) Applicant: United Services Automobile Association (USAA), San Antonio, TX (US)

(72) Inventors: Eric J. Smith, Helotes, TX (US); John McChesney TenEyck, Jr., San Antonio, TX (US); Gregory Yarbrough, San Antonio, TX (US); Vijay Jayapalan, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/129,097

(22) Filed: Sep. 12, 2018

Related U.S. Application Data (60) Provisional application No. 62/557,479, filed on Sep. 12, 2017.

(51) Int. Cl.
| | |
|---|---|
| *H04M 3/42* | (2006.01) |
| *H04M 3/51* | (2006.01) |
| *G06F 9/455* | (2018.01) |
| *G06Q 30/00* | (2012.01) |
| *G06F 9/451* | (2018.01) |
| *H04L 9/06* | (2006.01) |
| *G06F 16/182* | (2019.01) |

(52) U.S. Cl.
CPC ........ *H04M 3/42059* (2013.01); *G06F 9/451* (2018.02); *G06F 9/45558* (2013.01); *G06F 16/1834* (2019.01); *G06Q 30/016* (2013.01); *H04L 9/0643* (2013.01); *H04M 3/5191* (2013.01); *G06F 2009/45562* (2013.01); *G06F 2009/45595* (2013.01)

(58) Field of Classification Search
CPC .. H04M 3/523; H04M 2203/402; H04M 3/51; H04Q 3/64
USPC ............ 379/266.01, 266.02, 265.05, 265.11, 379/265.01
See application file for complete search history.

(56) References Cited

U.S. PATENT DOCUMENTS

| | | | |
|---|---|---|---|
| 2010/0310059 A1* | 12/2010 | Davis .................. | H04M 3/4938 379/88.18 |
| 2014/0115028 A1* | 4/2014 | Taylor .................. | H04L 67/141 709/202 |
| 2018/0011726 A1* | 1/2018 | Tsirkin ................ | G06F 9/45558 |

* cited by examiner

Primary Examiner — Thjuan K Addy
(74) Attorney, Agent, or Firm — Fish & Richardson P.C.

(57) ABSTRACT

A method includes in response to receiving identification information from a caller, selecting a virtual machine from a plurality of virtual machines, the virtual machine configured to generate a virtual user interface for an application executing on the virtual machine. The method includes populating the virtual user interface with information about the caller based on the received identification information. The method includes sharing the virtual user interface with an application executing on a computer of a customer service representative. The method includes connecting the caller with the customer service representative.

15 Claims, 8 Drawing Sheets

RAPID DATA ACCESS

CROSS-REFERENCE TO RELATED APPLICATION

This application claims priority under 35 U.S.C. § 119 to U.S. Application Ser. No. 62/557,479, filed on Sep. 12, 2017, and entitled "Rapid Data Access," the entire contents of which is incorporated by reference herein.

BACKGROUND

An organization may use any number of computing systems, communications networks, data storage devices, or other types of systems to provide service to individuals. An organization may also employ service representatives that use the various systems to assist individuals in service sessions that are conducted over the telephone, in a video conference, through text chat sessions, in person, and/or over other communication channels. Organizations may strive to provide an efficient and productive service interaction between service representatives and the individuals being serviced while maintaining an appropriate quality level for the service provided by service representatives.

SUMMARY

This specification describes technologies relating to automated dynamic call centers.

In one embodiment, the subject matter described in the detailed description includes methods that include the acts of in response to receiving identification information from a caller, selecting a virtual machine from a plurality of virtual machines, the virtual machine configured to generate a virtual user interface for an application executing on the virtual machine. The methods include the acts of populating the virtual user interface with information about the caller based on the received identification information. The method includes the acts of sharing the virtual user interface with an application executing on a computer of a customer service representative. The method also includes the acts of connecting the caller with the customer service representative.

Other embodiments of this aspect include corresponding computer systems, apparatus, and computer programs recorded on one or more computer storage devices, each configured to perform the actions of the methods. A system of one or more computers can be configured to perform particular actions by having software, firmware, hardware, or a combination of them installed on the system that in operation causes or cause the system to perform the actions. One or more computer programs can be configured to perform particular actions by including instructions that, when executed by data processing apparatus, cause the apparatus to perform the actions.

The preceding and other embodiments can each optionally include one or more of the following features, alone or in combination. The virtual user interface may be populated before sharing the application with the customer service representative. The methods may include the acts of in response to disconnecting the caller from the customer service representative, ceasing sharing of the virtual user interface with the customer service representative. The methods may include the acts of maintaining a pool of virtual machines, wherein the number of virtual machines in the pool is determined, as least in part, on an expected number of callers. The methods may include the acts of increasing the number of virtual machines in the pool based on an increase in some callers.

BRIEF DESCRIPTION OF DRAWINGS

Like reference numbers and designations in the various drawings indicate like elements.

DETAILED DESCRIPTION

A dynamic automated call distributor (ACD) can support a dynamic number of decentralized customer service representatives. The dynamic ACD can manage a number of potential customer services representatives available to handle calls remotely, for example, while working from home or another remote location. This dynamic ad-hoc arrangement enables flexibility for the customer service representative while enabling the ACD to meet service level agreements on call wait time (and other factors) while minimizing the out of pocket costs. The customer service representative can determine when they want to work and the minimum amount of money that they are willing to work for. For example, the customer service representatives can be paid on a per-call basis. This enables the call center to manage their call capacity dynamically.

In a typical remote call center model, individual customer service representatives may work remotely but tend to connect to a central computer using a virtual machine. Generally, virtual machines provide a substitute for a physical machine. They provide the functionality needed to execute entire operating systems. A computer server may run several different virtual machines and support several different users. Individual virtual machines are relatively resource intensive (requiring a substantial amount of memory and processing power). Further creating and deleting virtual machines can be a relatively time-consuming process, requiring several minutes. Therefore, in a dynamic automated call distributing system, where the number of CSRs may be fluid, creating a virtual machine for each CSR is not practicable.

Figure 1:
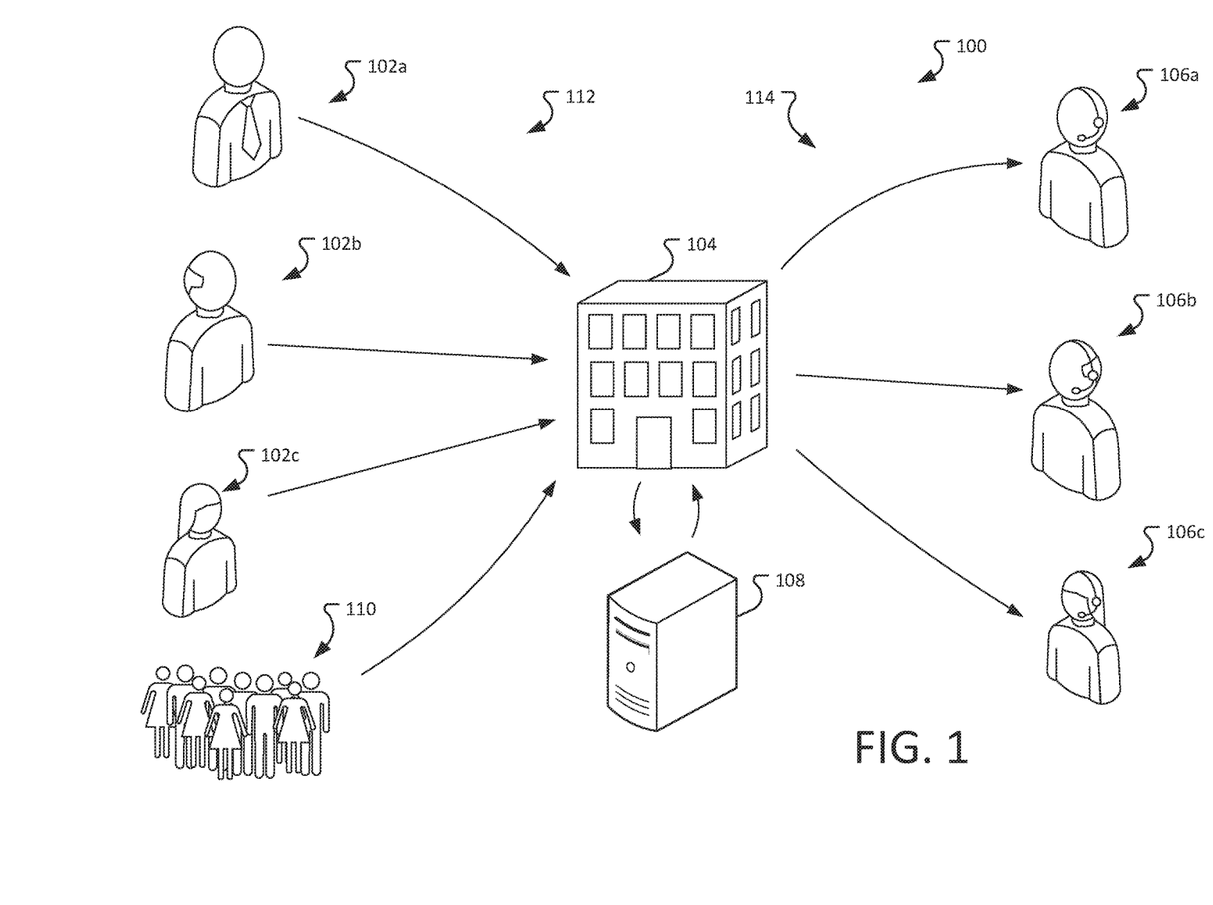
FIG. 1 illustrates an example of a call center environment with dynamic resource management.

FIG. 1 illustrates an example of a call center environment 100 with dynamic resource management. During normal call loads, callers 112 (as represented by individual callers 102a-c) call the call center 104 (or company) and are routed to customer service representatives (CSRs) 114 (represented by CSRs 106a-c). Callers 112 represent the demand for customer service capabilities, and the CSRs represent the supply of customer service capabilities. When the demand for customer service exceeds the supply of CSRs, callers can be routed to a queuing system 108. The queuing system can play music for the caller while they wait, and/or can present self-service options.

While under normal circumstances, call volume can be generally predicted. However, circumstances can occur where demand for customer service can suddenly increase, resulting in a large number of additional callers (represented by the crowd 110) to call the call center 104. For example, news that a retail chain had credit card numbers hacked or a natural disaster can cause the volume of calls to rise precipitously.

In a conventional call center, these callers would spend an excessive amount of time in a queue or can receive a busy signal when the queuing system is overloaded. However, the call center environment 100 includes the capability to dynamically assign additional CSRs 114 to handle the additional call volume, as explained further below. Further, the call center can allocate additional computer systems to handle queueing and managing the increased call volume.

At the same time, calls to a call center may be lower than expected. For example, due to a school vacation week, the start of a sporting season, etc. Under these circumstance, the call center can reduce the number of CSRs 114.

Figure 2:
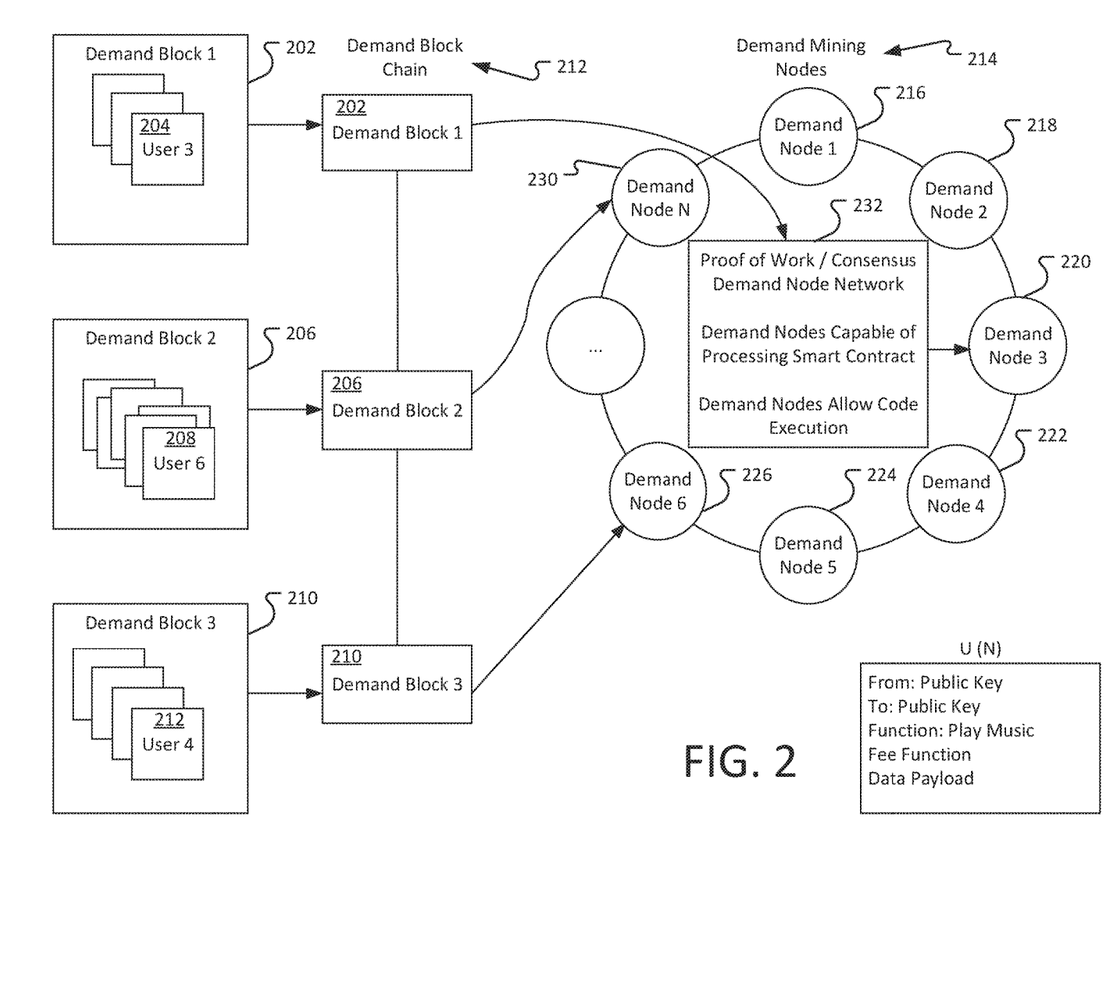
FIG. 2 illustrates an example system for allocating callers to different processing machines.

FIG. 2 illustrates an example system for allocating callers to different processing machines (referred to as nodes). When a caller calls into the call center, the caller can be grouped with other callers into demand blocks in a block chain.

To provide some basic context into blockchain technologies, in general, a blockchain is a public or private ledger of all transactions that have been executed in one or more contexts (e.g., negotiable instrument transactions, digital currency transactions, access determinations, instances of providing access, calls to a call center, customer service reps signing into a call center, etc.). A blockchain can grow as completed blocks are added with a new set of transactions. In some examples, a single block is provided from multiple transactions (e.g., multiple callers into a call center). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions. Each node maintains a copy of the blockchain, which is automatically downloaded to the node upon joining the peer-to-peer network. The blockchain protocol provides a secure and reliable method of updating the blockchain, copies of which are distributed across the peer-to-peer network, without the use of a central authority.

Because all entities on the blockchain network can need to know all previous transactions to validate a requested transaction, all entities must agree on which transactions have occurred, and in which order. For example, if two entities observe different transaction histories, they will be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain). Blockchains can also employ other protocols. In this context, the work is a task that is difficult for any single node (e.g., computing device) in the peer-to-peer network to quickly complete but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block and compete (e.g., perform work, as introduced above) to have their block added to the blockchain. A blockchain protocol includes a proof of work scheme that is based on a cryptographic hash function (CHF). An example CHF includes the secure hash algorithm 256 (SHA-256). In general, the CHF receives information as input and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes can compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner can be required to produce hundreds or thousands of hash values, before any one miner provides a qualifying hash value (e.g., at least the first four characters of the hash value are each zero).

In this example, demand nodes 214 (including demand nodes 1 216, demand node 2, 218, demand node 3 220, demand node 4 222, demand node 5 224, demand node 6 226, demand node N 230) can compete to manage a particular demand block. Custom block chain solutions can use different proof of work functions 232. For example, proof of work in the dynamic call center can include demonstrating the ability and readiness to manage the number of calls included in the demand block (that is, three users for demand block 1 202, six users for demand block 2 216, three users for demand block 3 210).

The ability to manage the number of calls can include verifying that the demand mining node includes the capability to queue the number of callers. The ability to manage the number of calls can also include demonstrating or verifying the ability to perform the required functions (such as the ability to play the recorded music, the ability to interface with a self-help function, and/or the ability to perform the necessary functions to match a caller with an available CSR). In some implementations, a cost can be associated with a particular demand mining node. The cost can be an out of pocket cost (for example, an amount charged to rent or use a particular node), the cost can also be an opportunity costs assigned by the call center. This cost can be used to prioritize the use of some mining nodes based on the mining node passing of performing the proof of work; demand blocks can be assigned to particular demand mining nodes. For example, demand block 1 202 can be assigned to demand node 3 220, demand block 2 206 can be assigned to demand block N 230, demand block 3 210 can be assigned to demand node 6 226.

Figure 3:
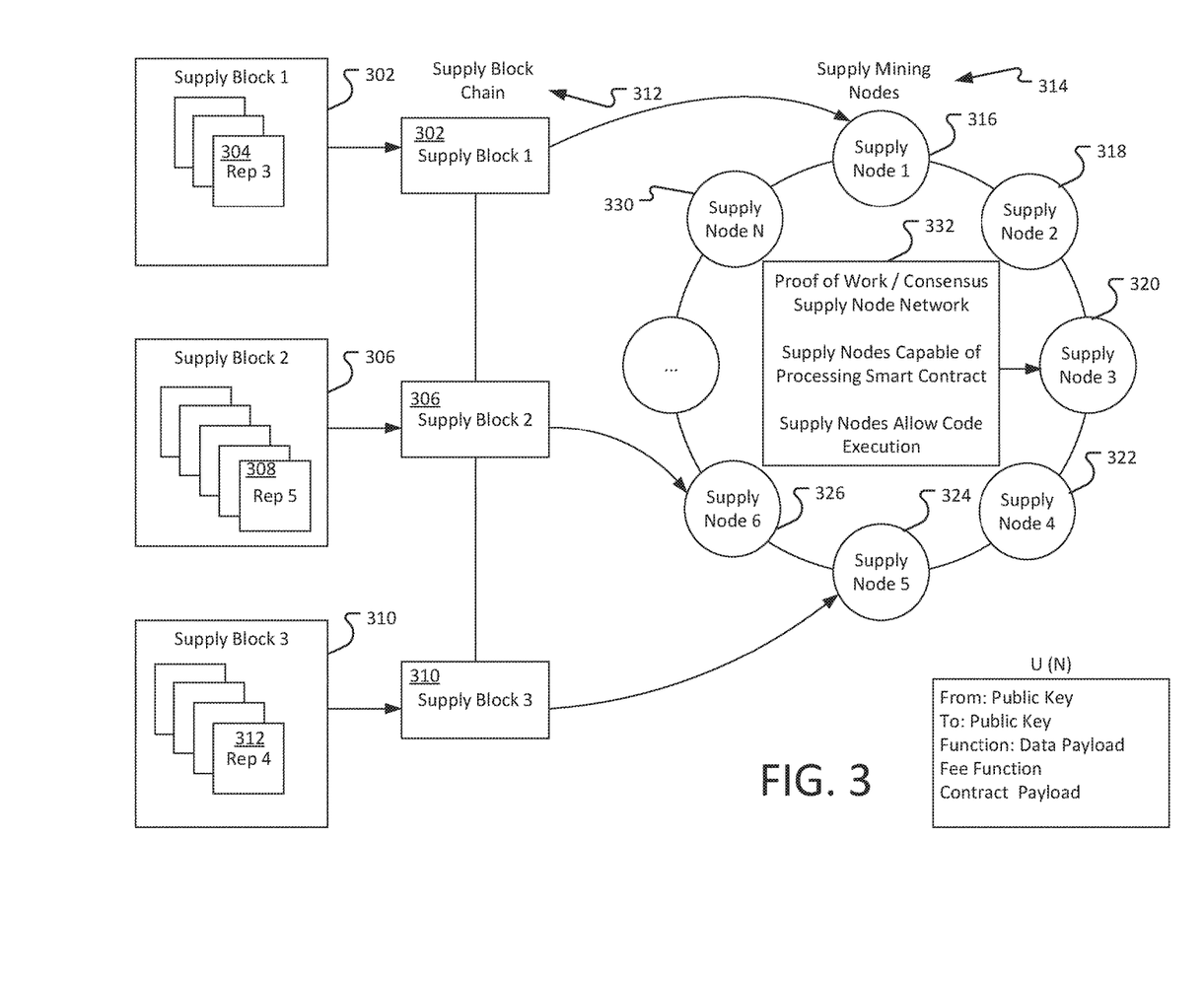
FIG. 3 illustrates registering CSRs to be ready to answer calls.

FIG. 3 illustrates a registering CSRs to be ready to answer calls. CSRs who log into the system can be grouped into supply blocks. For example, supply block 1 302 includes 3 CRs 304, supply block 2 306 includes 5 CSRs 308, and supply block 3 includes 4 CSRs 310.

In this example, supply nodes 314 (including supply nodes 1 316, supply node 2 318, supply node 3 320, supply node 4 322, supply node 5 324, supply node 6 326, supply node N 330) can compete to manage a particular supply block.

CSR's can be grouped into supply blocks based on, for example, the time that they registered their availability with the system, their qualifications, their price, reputations, etc. The supply nodes compete to provide services to the supply blocks by executing a proof of work. The proof of work can be, for example, proof that the supply nodes have sufficient resources to manage the CSRs in the supply block. The proof of work can also include logging the CSRs into the system and identifying the capability or qualifications of the CSRs. The proof of work can also include verifying that the CSR has the necessary computing resources set up and ready to display caller information and address caller concerns. The proof of work calculation can also include matching a price of the members of the supply block with a current price being paid by the call center for calls.

In this example, supply block 1 302 is assigned to supply node 1 316, supply block 2 306 is assigned to supply node 6 326, supply block 3 310 is assigned to supply node 5 324.

Once a particular supply block and a demand block have been assigned to supply nodes and demand nodes respectively, the system can match the individual callers with individual customer service representatives as described below.

Figure 4:
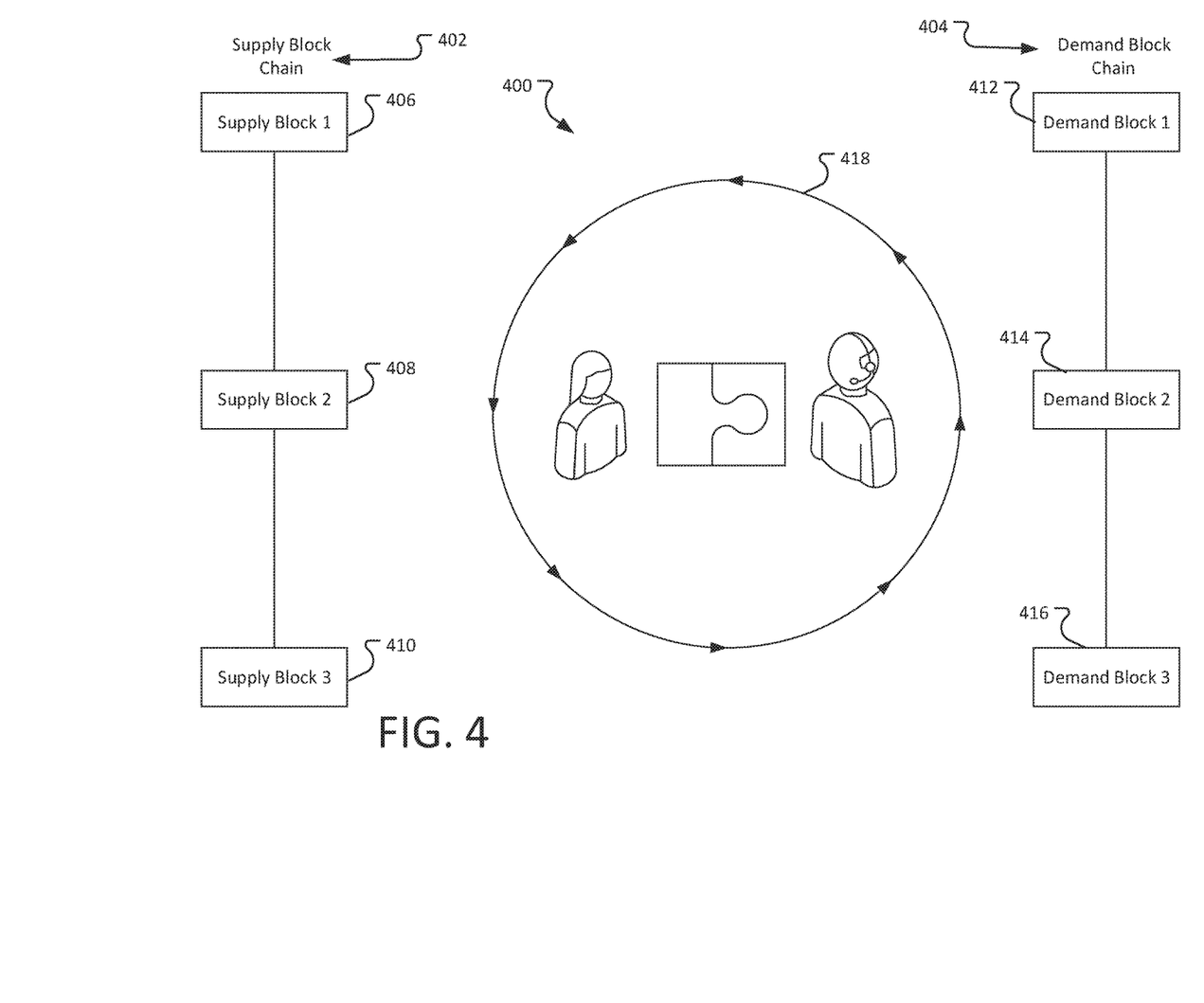
FIG. 4 illustrates an example system for matching supply blocks with demand blocks.

FIG. 4 illustrates an example system for matching supply blocks with demand blocks. The blocks in the supply block chain 402 can be matched with blocks in the demand chain 404 using a swarm algorithm 418.

Swarm algorithms describe collective behavior of decentralized, self-organized systems, natural or artificial. An agent can represent each caller and CSR. The agents are interacting locally with one another and with their environment to associate a particular caller with a particular CSR. Each of the agents follows simple rules that allow callers and CSRs to be connected without a centralized control structure dictating how individual agents should behave. Some implementations can use a distributed hash table algorithm, such as KADEMLIA (a distributed hash table for decentralized peer-to-peer computer networks).

In some implementations, matching a caller 420 with a CSR 424 can occur using a smart contract. Each caller may have certain requirements (represented by the puzzle pieces 422), these requirements may be determined by the automated call distributor (for example, the current price being paid per call, the required reputation of the CSR). The requirements also may be determined by the caller (for example, the subject and/or business unit associated with the caller's needs).

The CSRs may each be associated with their requirements (represented by the puzzle piece 426). For example, a CSR may be able to dictate an amount (or minimum amount) that they wish to be paid for taking the call. The CSR may also dictate the hours that the CSR is willing to take calls, a maximum number of calls that they are willing to take, or a commitment of a minimum number of calls per hour.

The CSR may also have qualifications. These qualifications can include, for example, certifications to handle calls in particular business areas, security clearance, and a reputation score.

The swarm algorithms may match a caller 420 with a compatible CSR 424 (that is a CSR's whose requirements and qualifications are compatible with the caller's requirements). For example, in some implementations, the swarm algorithm may match callers to CSRs based on based on price, reputations, and business area.

Figure 5:
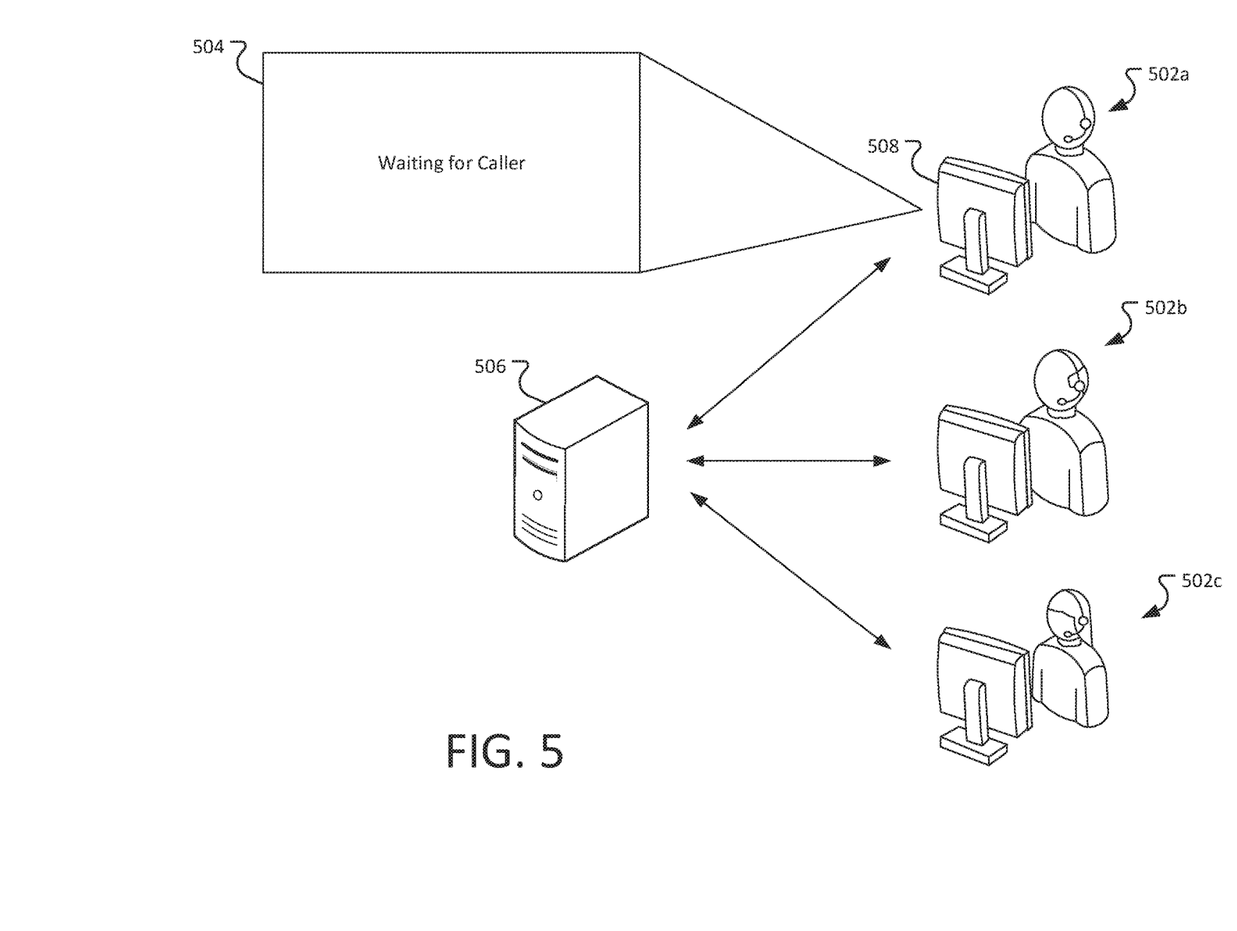
FIG. 5 illustrates an example of CSRs waiting to connect with a caller.

As described above, it is not always practicable to create a dedicated virtual machine for each CSR in the dynamic environment. FIG. 5 illustrates an example of CSRs 502*a-c* waiting to connect with a caller.

The CSR 502*a* is using a computer 508 to connect to the dynamic ACD 506. The CSR's computer 508 can execute a lightweight application with screen sharing capabilities. While the CSR waits to connect with a caller, the application may display a waiting message 504. In some implementations, other information may be displayed on the screen. For example, the application may display an anticipated wait time before the CSR connects to a call, a time elapsed since the last call and a current amount being paid by the dynamic ACD per call, the CSRs reputation score, and the CSRs most recent customer satisfaction ratings. T The application may also display the queues for which the CSR has registered. For example, the dynamic ACD 506 may maintain different queues for different types of calls. For example, calls about one business until may be separated from calls for a separate business unit. In some implementations, different queues may be used based on the necessary credentials required to handle the call.

Figure 6:
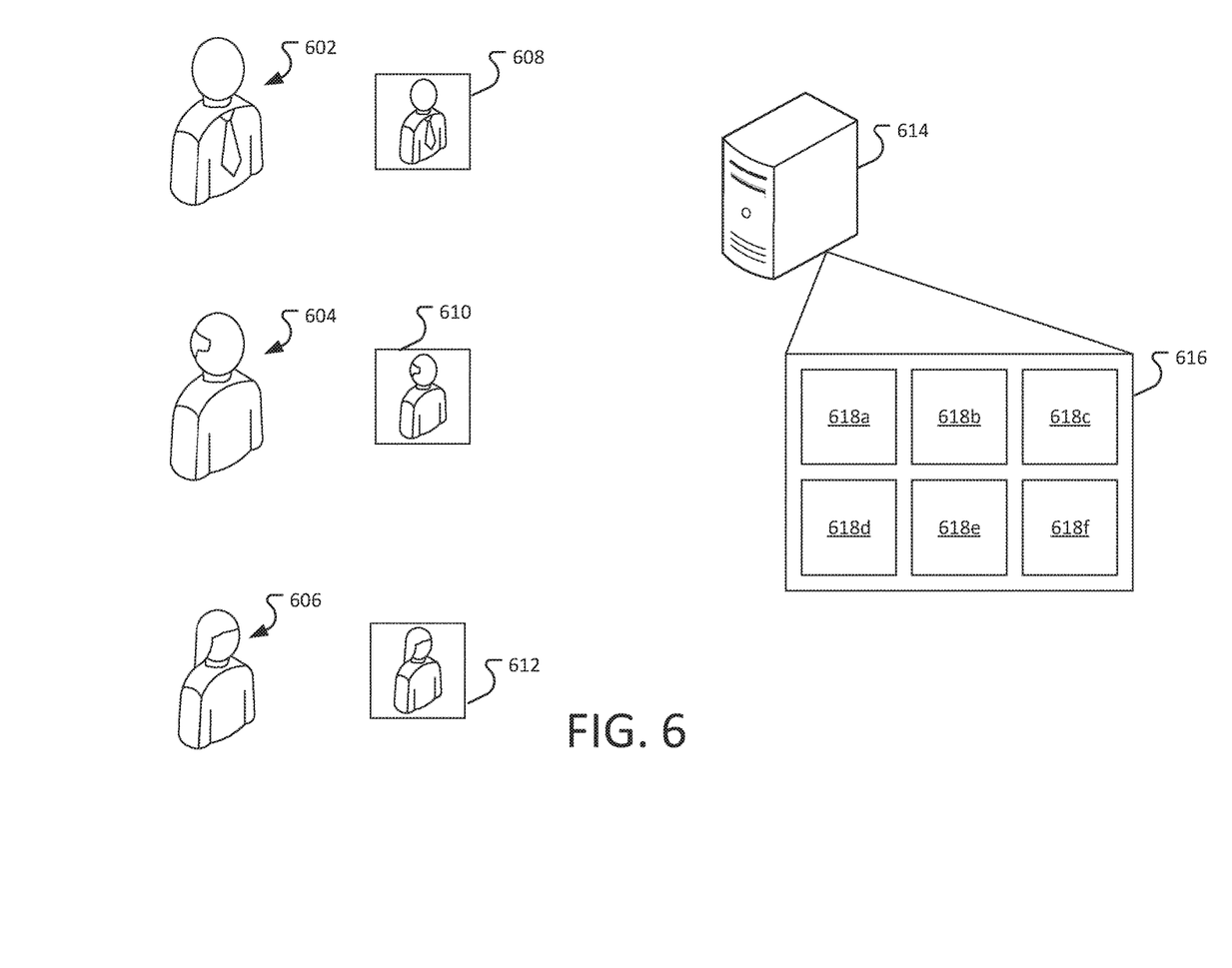
FIG. 6 illustrates collecting information for a CSR screen for a caller.

FIG. 6 illustrates collecting information for a CSR screen for a caller. Instead of having each CSR associated with a virtual machine, instead a dynamic ACD 614 allocating a virtual machine for each CSR, the dynamic ACD may allocate a virtual machine for callers. For example, the virtual machine 608 is populated with the data from the caller 602, the virtual machine 610 is populated with the data for the caller 604, and the virtual machine 612 is populated with the data for the caller 606. The data for a caller may be obtained when the caller provides information sufficient to identify the caller. This information can be, for example, an account number, a customer or member number, a telephone number, an e-mail address, a government issued id number (such as a social security number), etc.

The virtual machine is provided with the caller identifying information and can be programmed to obtain data for the caller and to present the information on a virtual user interface.

As discussed above, creating a new virtual machine may take a significant period (for example, 4 minutes). In some implementations, the dynamic ACD 614 may maintain a pool 616 (generally, a pool refers to a managed group of available resources, such as the virtual machines 608, 610, 612, 618*a-f*) of available virtual machines, for example, virtual machines 618*a-f*.

The dynamic ACD 614 to each caller in a queue (or to callers in a queue that are most likely to be connected with a CSR within a predetermined period (for example, the next 1 minute, the next 5 minutes, the next 10 minutes). In some implementations, the dynamic ACD 614 may assign a virtual machine to each caller as long as virtual machines are available in the pool 616.

Figure 7:
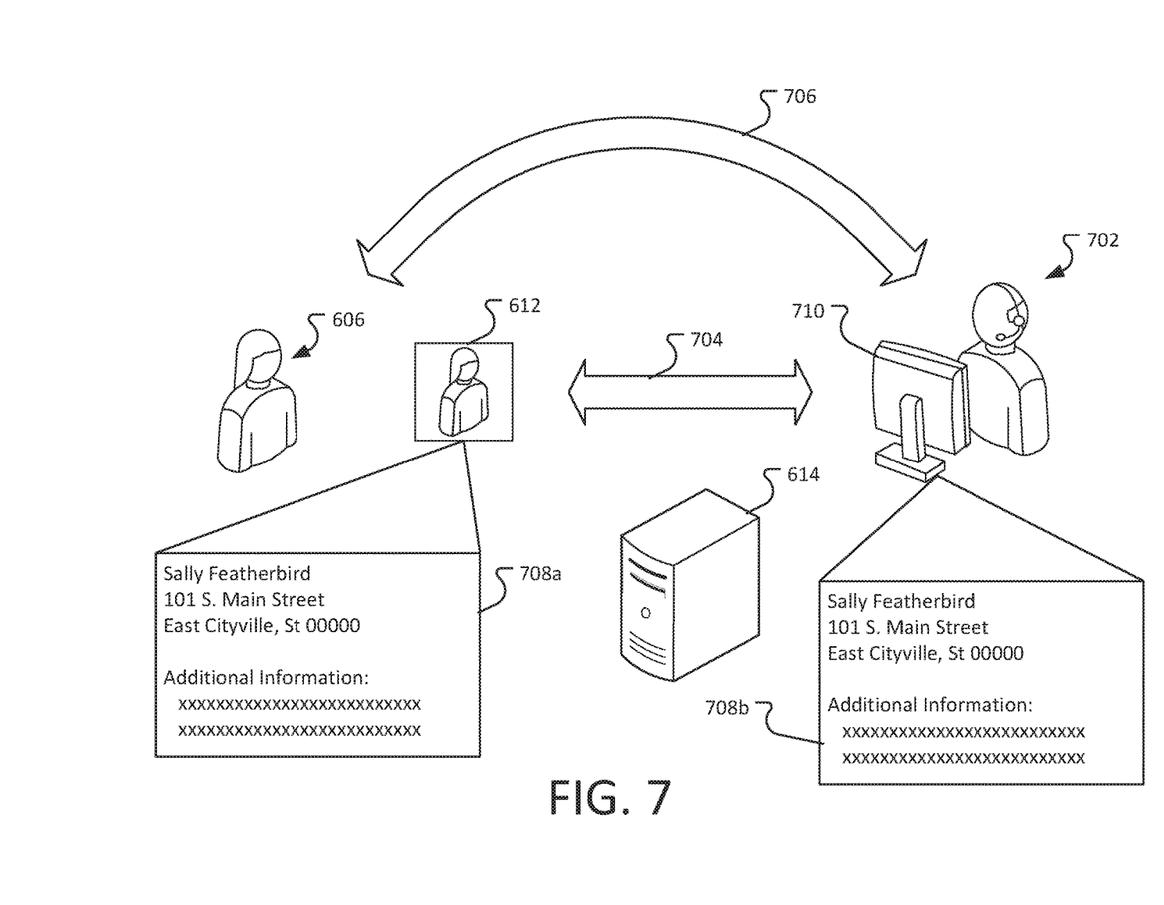
FIG. 7 illustrates connecting a virtual machine with the CSR.

While the pool 616 is shown as being on the dynamic ACD 614, it should be understood that the virtual machines may be executed on one or more different servers. A separate server may perform administration of the pool 616. I FIG. 7 illustrates connecting a virtual machine with the CSR. When a CSR 702 has been selected to handle a call from a caller 606, for example, a smart contract has been formed between the caller 606 and the CSR 702, as described above, the CSR may receive a notification from the dynamic ACD 614 notifying them that a call is available. When the CSR 702 accepts the call, the virtual machine 612 may share its virtual user interface 708*a* with the user interface 708*b* of the CSR 702, as represented by the two-headed arrow 704. Sharing the virtual user interface 708*a* may be performed by, for example, using screen-sharing technologies (generally, technologies and products that allow remote access and remote collaboration on a person's computer desktop through a graphical Terminal emulator).

Screen sharing may include, for example, remote desktop access that allows the CSR to access the virtual machine executing on a remote server (which may or may not be the dynamic ACD). The user interface may be displayed for the CSR 702 on a separate client device (such as the CSR's computer 710).

The caller 606 may be connected to the CSR 702 using audio communication, such as a telephone call, as represented by arrow 706.

When the call is completed, the virtual machine 612 may disconnect from the computer of the CSR 702 and may become available to load another caller's information.

Figure 8:
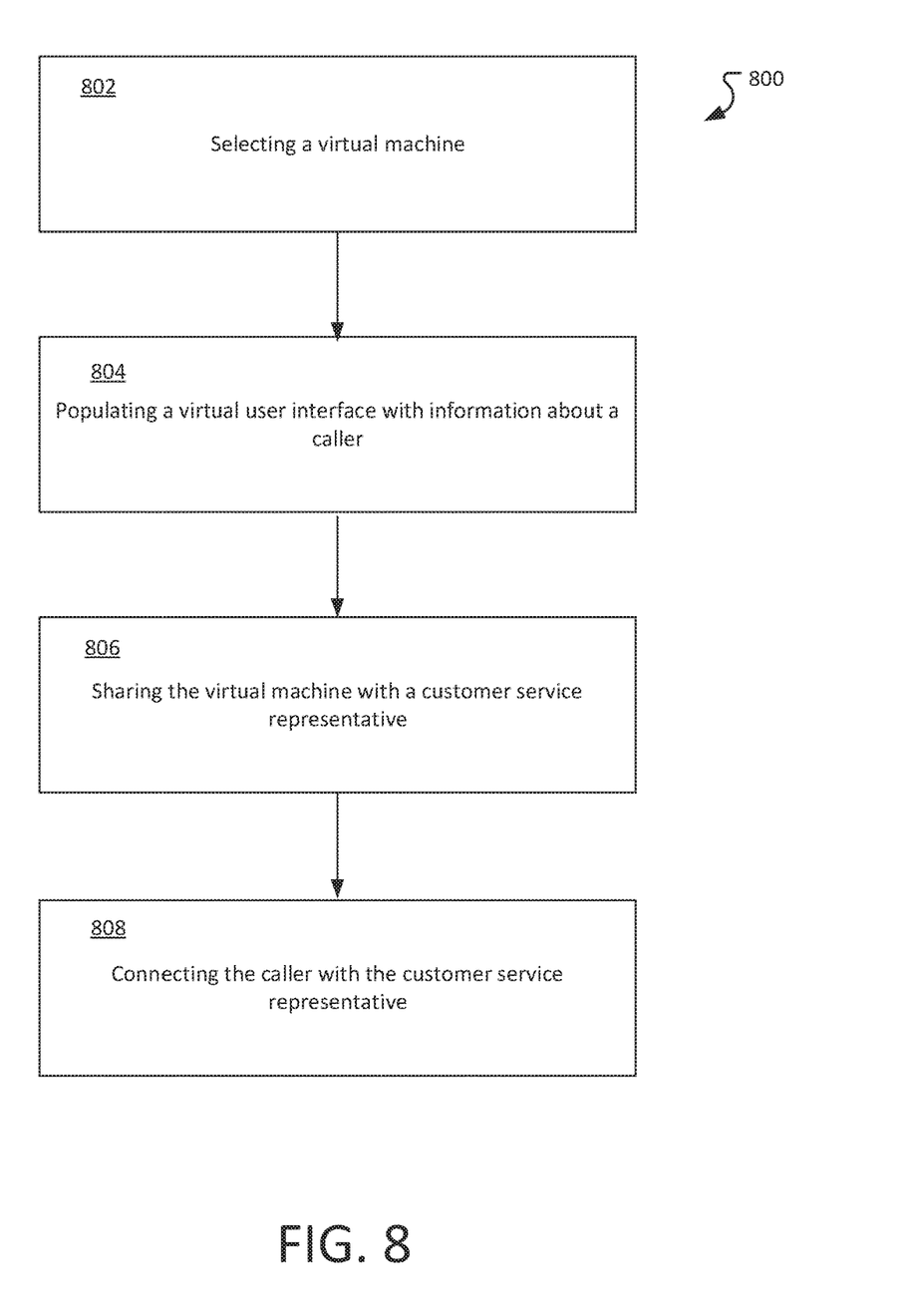
FIG. 8 illustrates an example of a process for connecting a caller and a customer service representative.

FIG. 8 illustrates an example of a process 800 for connecting a caller and a customer service representative. The process 800 may be performed for example, a computer system that includes a dynamic ACD.

The process 800 in selects a virtual machine from a plurality of virtual machines, the virtual machine configured to generate a virtual user interface for an application executing on the virtual machine. The virtual machine may be selected in response to receiving identification information from a caller, such as a membership number, an account number, a biometric identifier, etc.

The process 800 populates the virtual user interface with information about the caller based on the received identification information. The virtual user interface may be, for example, a user interface generated by the virtual machine. The virtual user interface is referred to as virtual in the sense that does not (at least initially) correspond to a user interface displayed on a physical machine.

The process 800 shares the virtual user interface with an application executing on a computer of a customer service representative. The virtual user interface may be shared with the customer service agent using screen sharing technology.

The process 800 connects the caller with the customer service representative.

In some implementations, the process 800 may disconnect the customer service representative, and the virtual user interfaces in response to the caller completing their call with the customer service representative.

Embodiments of the subject matter and the operations described in this specification can be implemented in digital electronic circuitry, or in computer software, firmware, or hardware, including the structures, disclosed in this specification and their structural equivalents, or in combinations of one or more of them. Embodiments of the subject matter described in this specification can be implemented as one or more computer programs (i.e., one or more modules of computer program instructions, encoded on computer storage mediums for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The computer storage medium can be non-transitory.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example, a programmable processor, a computer, a system on a chip, or multiple ones, or combinations, of the preceding. The apparatus can include special purpose logic circuitry (e.g., an FPGA (field programmable gate array) or an ASIC (application-specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various computing model infrastructures, such as web services, distributed computing and grid computing infrastructures.

A computer program (also known as a program, software, software application, script, or code) can be written in any form of programming language, including compiled or interpreted languages, declarative or procedural or object-oriented or functional languages, and it can be deployed in any form, including as a stand-alone program or as a module, component, subroutine, service, object, or another unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any digital, analog or quantum computer. Generally, a processor will receive instructions and data from a read-only memory or a random access memory or both. The essential elements of a computer are a processor for performing actions by instructions and one or more memory devices for storing instructions and data. A computer will also include, or be operatively coupled to receive, data from or transfer data to, or both, one or more mass storage devices for storing data (e.g., electronic, magnetic, magneto-optical disks, or optical disks), however, a computer need not have such devices. Moreover, a computer can be embedded in another device (e.g., a mobile telephone, a personal digital assistant (PDA), a mobile audio or video player, a game console, a GPS receiver, or a portable storage device (e.g., a universal serial bus (USB) flash drive)), to name just a few. Devices suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. Also, a computer can interact with a user by sending documents to and receive documents from a device that is used by the user (for example, by sending web pages to a web browser on a user's user device in response to requests received from the web browser).

Embodiments of the subject matter described in this specification can be implemented in a computing system that includes a back-end component (e.g., as a data server), a middleware component (e.g., an application server), or a front-end component (e.g., a user computer having a graphical user interface or a Web browser through which a user can interact with an implementation of the subject matter described in this specification), or any combination of one or more such back-end, middleware, or front end components. The components of the system can be interconnected by any form or medium of digital or optical data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are remote from each other and typically interact through a communication network. The relationship between user and server arises by computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features can be described above as acting in certain combinations and even initially claimed as such, one or more features from a claimed combination can, in some cases, be excised from the combination, and the claimed combination can be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. Also, the processes depicted in the accompanying figures do not necessarily require the particular order shown, or sequential order, to achieve desirable results. In certain implementations, multitasking and parallel processing can be advantageous.

What is claimed is:

1. A computer-implemented method of coordinating callers with customer service representatives, the method comprising:
   in response to receiving identification information from a caller, selecting a virtual machine from a plurality of virtual machines, the virtual machine configured to generate a virtual user interface for an application executing on the virtual machine;
   obtaining additional information about the caller using the received identification information;
   populating the virtual user interface with the additional information about the caller;

responsive to receiving an indication that a customer service representative is available for connecting with the caller, sharing the virtual user interface with an application executing on a computer of the customer service representative, wherein sharing the virtual user interface with the application causes the additional information to be displayed on a display device of the computer of the customer service representative; and connecting the caller with the customer service representative via an audio communication channel.

2. The computer-implemented method of claim 1, wherein the virtual user interface is populated prior to sharing the virtual user interface with the application.

3. The computer-implemented method of claim 1, further comprising, in response to disconnecting the caller from the customer service representative, ceasing sharing of the virtual user interface with the application.

4. The computer-implemented method of claim 1, further comprising maintaining a pool of virtual machines, wherein the number of virtual machines in the pool is determined, at least in part, on an expected number of callers.

5. The computer-implemented method of claim 4, further comprising increasing the number of virtual machines in the pool based on an increase in a number of callers.

6. A non-transitory computer storage medium encoded with computer program instructions that when executed by one or more computers cause the one or more computers to perform operations comprising:

in response to receiving identification information from a caller, selecting a virtual machine from a plurality of virtual machines, the virtual machine configured to generate a virtual user interface for an application executing on the virtual machine;

obtaining additional information about the caller using the received identification information;

populating the virtual user interface with the additional information about the caller;

responsive to receiving an indication that a customer service representative is available for connecting with the caller, sharing the virtual user interface with an application executing on a computer of the customer service representative, wherein sharing the virtual user interface with the application causes the additional information to be displayed on a display device of the computer of the customer service representative; and connecting the caller with the customer service representative via an audio communication channel.

7. The non-transitory computer storage medium of claim 6, wherein the virtual user interface is populated prior to sharing the virtual user interface with the application.

8. The non-transitory computer storage medium of claim 6, wherein the operations further comprise, in response to disconnecting the caller from the customer service representative, ceasing sharing of the virtual user interface with the application.

9. The non-transitory computer storage medium of claim 6, wherein the operations further comprise maintaining a pool of virtual machines, wherein the number of virtual machines in the pool is determined, at least in part, on an expected number of callers.

10. The non-transitory computer storage medium of claim 9, wherein the operations further comprise increasing the number of virtual machines in the pool based on an increase in a number of callers.

11. A system comprising:

one or more computers and one or more storage devices storing instructions that are operable, when executed by the one or more computers, to cause the one or more computers to perform operations comprising:

in response to receiving identification information from a caller, selecting a virtual machine from a plurality of virtual machines, the virtual machine configured to generate a virtual user interface for an application executing on the virtual machine;

obtaining additional information about the caller using the received identification information;

populating the virtual user interface with the additional information about the caller;

responsive to receiving an indication that a customer service representative is available for connecting with the caller, sharing the virtual user interface with an application executing on a computer of a customer service representative, wherein sharing the virtual user interface with the application causes the additional information to be displayed on a display device of the computer of the customer service representative; and connecting the caller with the customer service representative via an audio communication channel.

12. The system of claim 11, wherein the virtual user interface is populated prior to sharing the virtual user interface with the application.

13. The system of claim 11, wherein the operations further comprise, in response to disconnecting the caller from the customer service representative, ceasing sharing of the virtual user interface with the application.

14. The system of claim 11, wherein the operations further comprise maintaining a pool of virtual machines, wherein the number of virtual machines in the pool is determined, at least in part, on an expected number of callers.

15. The system of claim 14, wherein the operations further comprise increasing the number of virtual machines in the pool based on an increase in a number of callers.

* * * * *